US010190552B2

United States Patent
Tarabra et al.

(10) Patent No.: US 10,190,552 B2
(45) Date of Patent: Jan. 29, 2019

(54) INTERNAL COMBUSTION ENGINE PROVIDED WITH A DEVICE FOR THE AMPLIFICATION OF THE INTAKE SOUND

(71) Applicant: FERRARI S.p.A., Modena (IT)

(72) Inventors: Marco Tarabra, Castelnuovo Rangone (IT); Francesco Naclerio, Belluno (IT)

(73) Assignee: FERRARI S.P.A., Modena (IT)

(*) Notice: Subject to any disclaimer, the term of this patent is extended or adjusted under 35 U.S.C. 154(b) by 0 days.

(21) Appl. No.: 15/783,496

(22) Filed: Oct. 13, 2017

(65) Prior Publication Data

US 2018/0112636 A1  Apr. 26, 2018

(30) Foreign Application Priority Data

Oct. 17, 2016 (IT) .............. 1020160103942

(51) Int. Cl.
| | | |
|---|---|---|
| *F02M 35/10* | (2006.01) | |
| *F02M 35/12* | (2006.01) | |
| *G01H 3/04* | (2006.01) | |
| *B60K 13/02* | (2006.01) | |
| *G10K 11/22* | (2006.01) | |

(Continued)

(52) U.S. Cl.
CPC ........ *F02M 35/1294* (2013.01); *B60K 13/02* (2013.01); *F02M 35/10072* (2013.01); *F02M 35/10373* (2013.01); *F02M 35/1255* (2013.01); *F02M 35/1261* (2013.01); *G01H 3/04* (2013.01); *G10K 11/22* (2013.01); *F02M 35/104* (2013.01); *F02M 35/10157* (2013.01); *F02M 35/116* (2013.01)

(58) Field of Classification Search
CPC ........ F02M 35/1261; F02M 35/10072; F02M 35/1294; F02M 35/1255; F02M 35/10373; G01H 3/04
See application file for complete search history.

(56) References Cited

U.S. PATENT DOCUMENTS 7,975,802 B2   7/2011  Yokoya et al.
2007/0044747 A1  3/2007  Sawatari et al.
(Continued)

FOREIGN PATENT DOCUMENTS

| EP | 1304461 A1 | 4/2003 |
| EP | 1431536 A1 | 6/2004 |
| GB | 2413157 A | 10/2005 |

OTHER PUBLICATIONS

English Abstract of DE Application No. DE10016104 A1, published Oct. 4, 2004; 1 page.
(Continued)

*Primary Examiner* — Jacob Amick
(74) *Attorney, Agent, or Firm* — Cantor Colburn LLP

(57) ABSTRACT

An internal combustion engine comprising: a plurality of cylinders; at least one intake manifold, which receives fresh air from the outside; a plurality of intake channels, each connecting a cylinder to the intake manifold; and an intake sound amplification device, which is provided with an amplification pipe, an insulating element sealing the amplification pipe in a tight manner, a plurality of amplification channels, each originating from a corresponding intake channel, and an amplification manifold, which, on one side, is connected to all amplification channels and, on the other side, is connected to the amplification pipe.

11 Claims, 2 Drawing Sheets

(51) Int. Cl.
*F02M 35/104* (2006.01)
*F02M 35/116* (2006.01)

(56) References Cited

U.S. PATENT DOCUMENTS

| | | | | |
|---|---|---|---|---|
| 2009/0057054 | A1* | 3/2009 | Kostun | F02B 33/44 |
| | | | | 181/206 |
| 2009/0236171 | A1* | 9/2009 | Yokoya | F02M 35/10295 |
| | | | | 181/160 |
| 2011/0315472 | A1* | 12/2011 | Ohta | F02M 35/10295 |
| | | | | 181/157 |

OTHER PUBLICATIONS

English Abstract of DE Application No. DE10114397, published Sep. 26, 2002; 1 page.
English Abstract of DE Application No. DE10116169 (A1), published Oct. 17, 2002; 1 page.
English Abstract of DE Application No. DE19922216 (A1) published Nov. 30, 2000; 2 pages.
Machine Generated English Translation of Abstract of DE Application No. DE102013112409, translated Oct. 13, 2017—published May 28, 2015; 2 pages.

* cited by examiner

INTERNAL COMBUSTION ENGINE PROVIDED WITH A DEVICE FOR THE AMPLIFICATION OF THE INTAKE SOUND

PRIORITY CLAIM

This application claims priority from Italian Patent Application No. 102016000103942 filed on Oct. 17, 2016, the disclosure of which is incorporated by reference.

TECHNICAL FIELD

The present invention relates to an internal combustion engine provided with a device for the amplification of the intake sound.

PRIOR ART

U.S. Pat. No. 7,975,802B2 describes an internal combustion engine provided with a device for the amplification of the intake sound, which comprises an amplification pipe originating in the intake pipe between the air filter and the inlet valve and has an outlet opening, which is free and points towards the passenger compartment. The amplification pipe is provided with a membrane, which serves the purpose of sealing the intake pipe with respect to the external environment and is carried by a bellows to be free to vibrate so as to generate sound waves under the thrust of the pressure waves present in the intake pipe.

However, in the known devices for the amplification of the intake sound, for example of the type described in U.S. Pat. No. 7,975,802B2, the intake sound conveyed from the intake pipe to the inside of the passenger compartment is not very natural (and therefore unpleasant because "artificial").

Patent application DE19922216A1 and patent application DE10116169A1 describe an internal combustion engine comprising: a plurality of cylinders; an intake manifold that receives fresh air from the outside environment; a plurality of intake channels, each of which connects a cylinder to the intake manifold; and an intake sound amplification device provided with an amplification pipe and an insulating element that seals the amplification pipe in a tight manner. According to a possible embodiment, the head end of the amplification pipe is connected to the intake manifold.

DESCRIPTION OF THE INVENTION

The object of the present invention is to provide an internal combustion engine provided with a device for the amplification of the intake sound, said combustion engine being easy and inexpensive to manufacture and free from the drawbacks described above, i.e. allows for perceiving within the passenger compartment an intake sound which is natural, and therefore more pleasant for the driver and the passengers.

According to the present invention, an internal combustion engine provided with a device for the amplification of the intake sound is provided as claimed in the appended claims.

BRIEF DESCRIPTION OF THE DRAWINGS

The present invention will now be described with reference to the accompanying drawings, which illustrate a non-limiting embodiment thereof, in which.

PREFERRED EMBODIMENTS OF THE INVENTION

Figure 1:
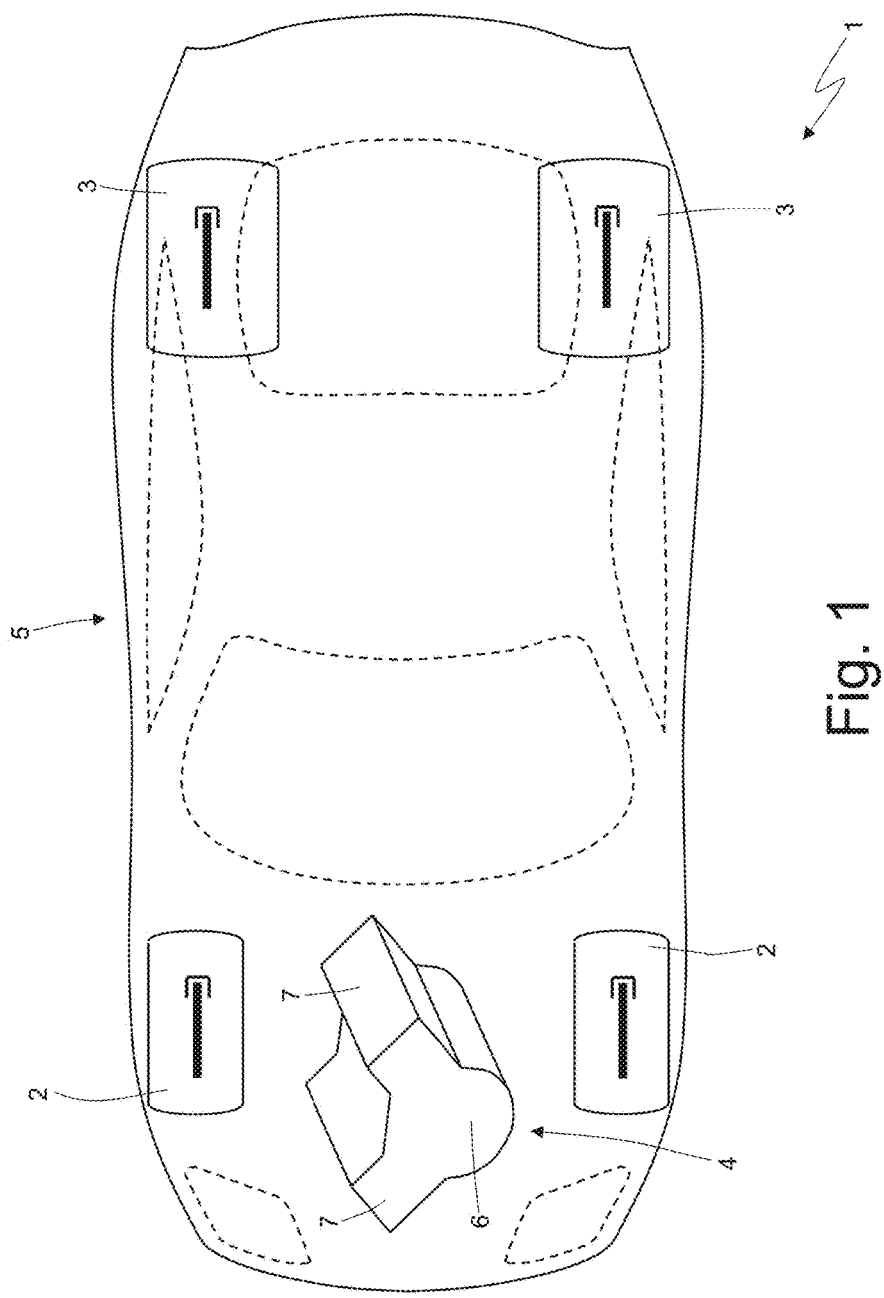
FIG. 1 is a schematic view of a car provided with an internal combustion engine manufactured according to the present invention.

In FIG. 1, the numeral 1 indicates, as a whole, a car equipped with two front wheels 2 and two rear driving wheels 3, which receive the driving torque from a combustion heat engine 4 arranged in the front. The car 1 is provided with a passenger compartment 5, which is adapted to accommodate the driver and any passengers. The internal combustion heat engine 4 has a base 6 from which two banks 7 of cylinders 8 (partially shown in FIG. 2) rise, which are mutually angled so as to form a "V", each having four cylinders 8 (i.e., overall, the internal combustion heat engine 4 is a "V8" engine); obviously, according to other embodiments not shown, the number and/or arrangement of the cylinders may be different. The two banks 7 of cylinders of the internal combustion heat engine 4 are mutually identical and completely independent of each other, i.e. each having its own intake system and its own exhaust system.

Figure 2:
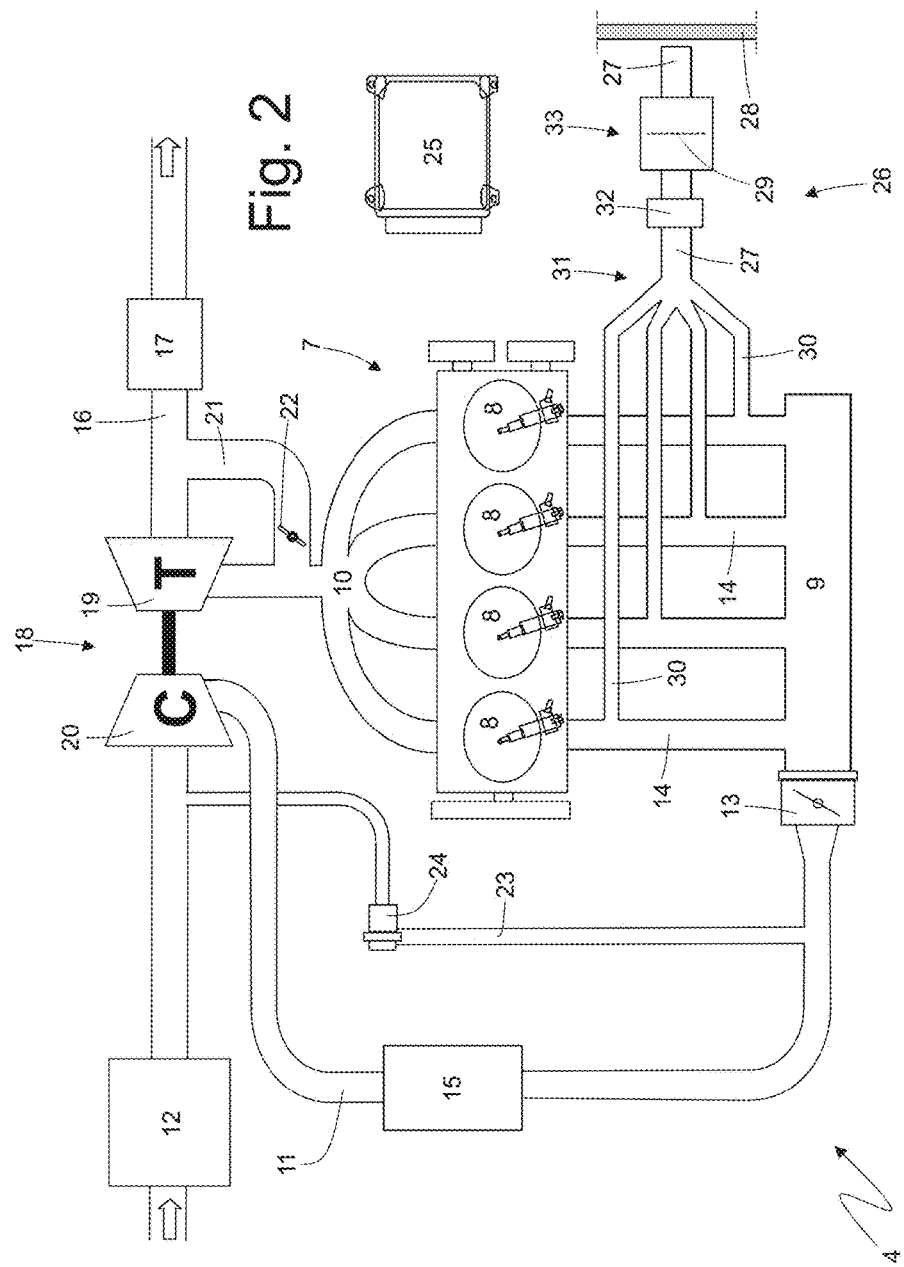
FIG. 2 is a schematic view of an internal combustion engine bank of FIG. 1.

As shown in FIG. 2, each bank 7 comprises four cylinders 8, each of which is connected to an intake manifold 9 (also designated as intake lung) via at least one respective intake valve (not shown), and to an exhaust manifold 10 via at least one respective exhaust valve (not shown). Each intake manifold 9 receives fresh air (i.e. air from the external environment) through an intake pipe 11, which is provided with an air filter 12 and is controlled by a throttle valve 13. Each intake manifold 9 is connected to the respective cylinders 8 via corresponding intake channels 14 (also called intake runners); i.e. each intake channel 14 connects one cylinder 8 to the corresponding intake manifold 9. An intercooler 15, whose function is to cool the intake air, is arranged along each intake pipe 11. Each exhaust manifold 10 is connected to an exhaust pipe 16 that feeds the exhaust gases produced by combustion to an exhaust system, which emits the gases produced by combustion into the atmosphere and normally comprises at least one catalyst 17 and at least one silencer (not shown) arranged downstream of the catalyst 17.

Each bank 7 comprises its own supercharging system provided with a turbocharger 18; each turbocharger 18 is provided with a turbine 19, which is arranged along the exhaust pipe 16 so as to rotate at high speed under the action of the exhaust gases expelled from the cylinders 8, and a supercharger 20, which is arranged along the intake pipe 11 and is mechanically connected to the turbine 19 to be driven into rotation by the turbine 19 itself so as to increase the pressure of the air fed into the feeding pipe 11.

The turbocharger 18 comprises a bypass pipe 21, which is connected in parallel to the turbine 19 so as to have its ends connected upstream and downstream of the turbine itself; a wastegate valve 22 is arranged along the bypass pipe 21, the former being adapted to adjust the flow rate of the exhaust gases flowing through the bypass pipe 21 and controlled by an actuator (not shown). Furthermore, the turbocharger 18 comprises a bypass pipe 23, which is connected in parallel to the supercharger 20 so as to have its ends connected upstream and downstream of the supercharger 20 itself; a Poff valve 24 is arranged along the bypass pipe 23, the former being adapted to adjust the flow rate of the fresh air flowing through the bypass pipe 23 and controlled by an actuator (not shown).

The internal combustion engine 4 is controlled by an electronic control unit 25, which supervises the operation of all the components of the internal combustion engine 4.

Each bank 7 of the internal combustion engine 4 comprises an intake sound amplification device 26 which serves to amplify the intake sound so that the overall sound generated by the internal combustion engine 4 and perceived by the occupants of the car 1 is more "intense" and more "pleasant", i.e. more compliant with the desires/expectations of the occupants of the car 1. The presence of the intake sound amplification devices 26 is particularly useful in the case of turbo-compression since the presence of the supercharger 20 and the intercooler 15 along each intake pipe 11 attenuates (compared to a similar naturally aspirated engine) the level of the intake sound generated by the internal combustion engine 4.

Each amplification device 26 comprises an amplification pipe 27 that is oriented towards the passenger compartment 5 of the car 1 and ends in close proximity of a firewall 28 that separates the engine compartment (in which the internal combustion engine 4 is housed) from the passenger compartment 5. In other words, the terminal end of each amplification pipe 27 is oriented towards the passenger compartment 5 of the car 1 and faces the firewall 28; alternatively, the terminal end of the amplification pipe 27 may be very close to, yet disunited from, the firewall 28, or the terminal end of the amplification pipe 27 may be in contact with the firewall 28.

An insulating element 29, which seals the amplification pipe 27 in a tight manner, is arranged along each amplification pipe 27. In other words, the function of each insulating element 29 is to prevent the amplification pipe 27 from interfering with the intake of air into the cylinders 8, and it performs this function by tight sealing said amplification pipe 27; in this way, no type of air circulation whatsoever can occur along the amplification pipe 27, which could disrupt the intake of air into the cylinders 8. It is important to emphasize that the amplification pipe 27 only has an acoustic function (i.e. it has no effect on the intake of air).

Each insulating element 29 is shaped so as to prevent the passage of air (i.e. to seal in a pneumatically tight manner) and allow (facilitate) the passage of sound (i.e. of the acoustic waves). By way of a non-limiting example, each insulating element 29 could comprise a rigid membrane and an elastic ring element (which may be flat or cup-shaped), which is arranged around the membrane and fixed to the inner wall of the amplification pipe 27. In this manner, the membrane is suspended inside the amplification pipe 27 and is free to oscillate under the thrust of the pressure pulsations of the air present in the intake pipe 11; this oscillation of the membrane generates sound waves that propagate along the amplification pipe 27 downstream of the membrane until reaching the firewall 28.

Each amplification device 26 comprises a plurality of amplification channels 30, each originating from a corresponding intake channel 14, and an amplification manifold 31, which, on one side, is connected to all amplification channels 30 and, on the other side, is connected to the amplification pipe 27. Importantly, each amplification channel 30 is devoid of insulating elements or filters for a direct and unobstructed connection of the corresponding intake channel 14 to the amplification manifold 31.

In the embodiment illustrated in FIG. 2, each amplification manifold 31 is of the "four-in-one" type, i.e. all four amplification channels 30 directly lead into the amplification manifold 31 and, therefore, only join one another in the amplification manifold 31. According to an alternative, and perfectly equivalent embodiment not illustrated, the four amplification channels 30 join one another in a pair-wise manner in respective convergences arranged upstream of the amplification manifold 31, i.e. two convergences of the "two-in-one" type are provided, in which the four amplification channels 30 become two, which join in the amplification manifold 31 (which, therefore, is of the "two-in-one" type).

In the embodiment illustrated in FIG. 2, each bank 7 comprises its own amplification manifold 31 that originates its own amplification pipe 27. According to a different, and perfectly equivalent, embodiment not illustrated, the internal combustion engine 4 comprises a single amplification pipe 27 common to both banks 7; in this case, two amplification manifolds 31 can be provided, which receive the amplification channels 30 from the corresponding banks 7 and then converge together towards the single amplification pipe 27, or a single amplification manifold 31 may be provided, which receives the amplification channels 30 from both banks 7 and then leads toward the single amplification pipe 27.

According to a preferred embodiment, in each bank 7 all amplification channels 30 have the same length (within a certain tolerance which may be, for example, 3-5%); this feature is important because when all amplification channels 30 of each bank 7 have the same length, the acoustic waves in the amplification channels 30 (and coming from the respective intake channels 14) combine with each other (when they arrive in the amplification manifold 31) providing a final result that is particularly pleasant to the human ear. In particular, when all amplification channels 30 of each bank 7 have the same length, the so-called "semitones" of the acoustic waves that are present in the amplification channels 30 and have a dissonant effect cancel each other out, thus leaving an overall (resulting) sound in the amplification manifold 31 (and therefore in the amplification pipe 27) that is very pleasant to the human ear.

According to a possible, yet not binding, embodiment illustrated in FIG. 2, each amplification device 26 comprises at least one acoustic sensor 32 (preferably of the low-pass type to block the higher frequencies) arranged along the amplification pipe 27. According to an alternative, and perfectly equivalent, embodiment not shown, each amplification device 26 is devoid of the acoustic sensor 32.

According to a possible, yet not binding, embodiment illustrated in FIG. 2, each amplification device 26 comprises at least one acoustic resonator 33 arranged along the amplification pipe 27; preferably, but not necessarily, the acoustic resonator 33 resonates under the effect of the pulsing pressure of the air in the amplification pipe 27 within a frequency range ranging from 350 to 600 Hz (this frequency band is the most suitable for transferring the feeling of a sporty sound). According to an alternative, and perfectly equivalent, embodiment not shown, each amplification device 26 is devoid of the acoustic resonator 33.

Preferably, but not necessarily, the insulating element 29 of each amplification pipe 27 is arranged inside the acoustic resonator 33; alternatively, the insulating element 29 of each amplification pipe 27 may be arranged upstream or downstream of the acoustic resonator 33.

In the exemplary embodiment illustrated in the attached figures, the internal combustion engine 4 is a "V8" engine;

alternatively, the internal combustion engine 4 may have any other number and arrangement of cylinders 8, for example: four cylinders 8 in-line, six cylinders 8 in-line, six "V" cylinders 8, six boxer cylinders 8, ten "V" cylinders 8, twelve "V" cylinders 8.

The internal combustion engine 4 described above and provided with the amplification device 26 has many advantages.

Firstly, the amplification device 26 allows the intake sound from the internal combustion engine 4 to be amplified (and thus enhanced) with a mode that is extremely pleasant (and therefore appreciated) to/by the occupants of the passenger compartment.

Moreover, the amplification device 26 is simple and inexpensive to manufacture, since it consists essentially of plastic pipes (the amplification pipes 27, amplification channels 30, amplification manifolds 31), which are combined with passive bodies (the insulating elements 29, acoustic sensors 32, acoustic resonators 33) that are easy to construct.

The invention claimed is:

1. An internal combustion engine (4) comprising:
    a plurality of cylinders (8);
    at least one intake manifold (9), which receives fresh air from the outside;
    a plurality of intake channels (14), each connecting a cylinder (8) to the intake manifold (9); and
    an intake sound amplification device (26), which is provided with an amplification pipe (27) and with an insulating element (29), which seals the amplification pipe (27) in a tight manner;
    the internal combustion engine (4) is characterized in that the amplification device (26) comprises:
    a plurality of amplification channels (30), each originating from a corresponding intake channel (14); and
    an amplification manifold (31), which, on one side, is connected to all amplification channels (30) and, on the other side, is connected to the amplification pipe (27).

2. The internal combustion engine (4) according to claim 1, wherein each amplification channel (30) is devoid of insulating elements or filters for a direct and unobstructed connection of the corresponding intake channel (14) to the amplification manifold (31).

3. The internal combustion engine (4) according to claim 1, wherein all amplification channels (30) have the same length.

4. The internal combustion engine (4) according to claim 1, wherein all amplification channels (30) directly lead into the amplification manifold (31) and, therefore, only join one another in the amplification manifold (31).

5. The internal combustion engine (4) according to claim 1, wherein at least two amplification channels (30) join one another in a convergence arranged upstream of the amplification manifold (31).

6. The internal combustion engine (4) according to claim 1, wherein the amplification device (26) comprises at least one acoustic sensor (32) arranged along the amplification pipe (27).

7. The internal combustion engine (4) according to claim 6, wherein the acoustic sensor (32) is of the low-pass type.

8. The internal combustion engine (4) according to claim 1, wherein the amplification device (26) comprises at least one acoustic resonator (33) arranged along the amplification pipe (27).

9. The internal combustion engine (4) according to claim 8, wherein the insulating element (29) is arranged inside the acoustic resonator (33).

10. The internal combustion engine (4) according to claim 8, wherein the acoustic resonator (33) resonates under the effect of the pulsing pressure of the air in the amplification pipe (27) within a frequency range ranging from 350 to 600 Hz.

11. The internal combustion engine (4) according to claim 1, wherein the amplification pipe (27) is designed to be oriented towards a passenger compartment (5) of a vehicle (1) provided with the internal combustion engine (4).

* * * * *